United States Patent [19]
Ziegler

[11] Patent Number: 5,687,657
[45] Date of Patent: Nov. 18, 1997

[54] METHOD OF AND DEVICE FOR REDUCING THE DUST CONTENT OF THE EXHAUST GASES OF A STEAM GENERATOR

[75] Inventor: Geoarg Ziegler, Winterthur, Switzerland

[73] Assignee: Asea Brown Boveri AG, Baden, Switzerland

[21] Appl. No.: 629,736

[22] Filed: Apr. 9, 1996

[30] Foreign Application Priority Data

Jun. 12, 1995 [DE] Germany .................. 195 21 321.1

[51] Int. Cl.⁶ ........................................................ F23B 7/00
[52] U.S. Cl. .......................... 110/234; 122/40; 110/203; 422/145
[58] Field of Search .......................... 110/216, 244, 110/245, 234, 344, 345, 203; 122/4 D; 422/145, 147

[56] References Cited

U.S. PATENT DOCUMENTS 4,449,482  5/1984  Leon et al. .................. 122/4 D

FOREIGN PATENT DOCUMENTS

| 340554 | 9/1921 | Germany . |
| 703018 | 2/1941 | Germany . |
| 1128873 | 5/1962 | Germany . |
| 4040809A1 | 6/1992 | Germany . |
| 4112454A1 | 10/1992 | Germany . |
| 4436207A1 | 7/1995 | Germany . |

OTHER PUBLICATIONS

"Thermische Abfallbehandlung", Thome–Kozmiensky, EF–Verlag fur Energie–und Umwelttechnik GmbH, 1994.

*Primary Examiner*—Henry A. Bennett
*Assistant Examiner*—Pamela A. O'Connor
*Attorney, Agent, or Firm*—Burns, Doane, Swecker & Mathis, L.L.P.

[57] ABSTRACT

In a method of and a device for reducing the dust content of the exhaust gases (18) of a steam generator which consists of a combustion chamber (1), a radiation part (2) and a convection part (3) and has at least two vertical gas passes (4, 5), the dust portion of the exhaust gases (18) is reduced before the exhaust gases (18) enter the convective part (3) of the steam generator. The front wall (7) and/or the rear wall (8) of the steam generator is of double-sided design in the region of the gas deflection from the vertical pass (4) having downward flow to the vertical pass (5) having upward flow, the outer wall (12) consisting of a known gastight tube-web-tube construction (13) and the inner wall (14) consisting of tubes (15) which are arranged in such a way that an intermediate space (16) through which flow can occur is present in each case between the tubes (15), a flow-stabilized zone (17) being defined by the outer wall (12) and the inner wall (14), and the inner (14) and the outer wall (12) being cooled by means of cooling fluid flowing through the tubes.

10 Claims, 4 Drawing Sheets

METHOD OF AND DEVICE FOR REDUCING THE DUST CONTENT OF THE EXHAUST GASES OF A STEAM GENERATOR

BACKGROUND OF THE INVENTION

1. Field of the Invention

The invention relates to a method of and device for reducing the dust content of the exhaust gases of a steam generator which consists of a combustion chamber, a radiation part and a convection part and which has at least two vertical gas passes following the combustion chamber.

2. Discussion of Background

At present, refuse incineration boilers with horizontal convective pass are preferably used as boilers for incinerator plants in Central European countries, in which boilers the gas flowing out of the combustion chamber flows via a first open pass having downward flow into a second open pass having upward flow and then into a horizontal bank pass. Apart from these horizontal steam generators, vertical steam generators for incinerator plants are also known which are mostly of 3- or 4-pass type of construction (K. J. Thomé-Kozmiensky: Thermische Abfallbehandlung. EF-Verlag f ür Energie- und Umwelttechnik GmbH, 1994, pp. 390–402).

Little attention has been paid hitherto to the dust separation in these boilers. Importance is merely attached to an operationally reliable discharge of the dust, which falls from the walls by dedusting or by peeling.

However, a relatively large amount of dust (2–5 g/Nm$^3$) is entrained from the combustion chamber during the firing of the incinerator plant. This high dust portion is undesirable, for it causes the following problems:

The dust accumulates on the heating surfaces so that the latter must accordingly be made oversized. In addition, they must be constructed in such a way that they can be cleaned by tapping or soot blowing.

In the gas-cleaning plant arranged downstream of the boiler, expensive electrostatic filters and washers have to be used for the dust separation.

In the horizontal part of the boiler, the deposited dust encourages the catalytic formation of dioxin. This reaction (Denovo synthesis) takes place if gas having oxygen and chlorine portions comes in contact with a catalyst (in the present case, the dust acts as a catalyst) at a temperature between 250° and 500° C. and a dwell time of several seconds. Flue gas and dust which is present in a virtually dioxin-free state after the combustion becomes dioxinous again below 500° C. due to this Denovo synthesis.

The disposal of dioxinous dust is an expensive environmental problem.

The cleaning of dioxinous exhaust gases is very expensive.

In more recent tenders, a dust content of the crude gases of 1–2 g/Nm$^3$ is required, which can no longer be adhered to by firing measures alone. For a high-dust SCR (selective catalytic reduction) plant (NOx catalysts are arranged upstream of the flue-gas cleaning and upstream of the electrostatic filter), a dust content of even less than 1 g/Nm$^3$ is required, since the flue-gas nitrogen-reduction reactor is laden with dust on account of this arrangement and has only a reduced service life.

SUMMARY OF THE INVENTION

Accordingly, one object of the invention, in attempting to avoid all these disadvantages, is to develop a novel method of and a novel device for reducing the dust portion of the dust-laden exhaust gases of a steam generator, for example a boiler for incinerator plants, the steam generator having at least two vertical gas passes following the combustion chamber, in which method and device a clearly reduced dust content of the exhaust gases is achieved with relatively simple means and which can also be used in existing plants without problem.

According to the invention, this is achieved in a method according to the preamble of claim 1 when the dust portion of the exhaust gases is reduced before the exhaust gases enter the convective part of the steam generator, the separation of the dust being improved in the region of the gas deflection from the vertical pass having downward flow to the vertical pass having upward flow by creating flow-stabilized zones, and the dust being discharged from this region.

According to the invention, this is achieved in a steam generator according to the preamble of the claim relating to the device when the front wall and/or the rear wall of the steam generator is of double-sided design in the region of the gas deflection from the vertical pass having downward flow to the vertical pass having upward flow, the outer wall including a known gastight tube-web-tube construction and the inner wall including tubes which are arranged in such a way that an intermediate space through which flow can occur is present in each case between the tubes, a flow-stabilized zone being defined by the outer wall and the inner wall, and the inner and the outer wall being cooled by means of cooling fluid flowing through the tubes.

The advantages of the invention include, inter alia, the fact that the dust separation is encouraged in the region of the gas deflection and the dust, once deposited, is no longer entrained. Since the dust content of the exhaust gases is reduced before the gases enter the convective part of the boiler, the catalytic formation of dioxin is reduced. In addition, the cleaning effort required at the heating surfaces and in the gas-cleaning plant arranged downstream of the boiler is reduced.

It is especially expedient if the inner and outer walls are integrated in the circulation system of the steam generator and are cooled by evaporating water, since an additional separate cooling circuit is consequently unnecessary.

Furthermore, it is advantageous if baffle plates are attached to the inner wall approximately perpendicularly to the direction of flow, since the separation of the dust is thereby improved.

Finally, guide plates are advantageously attached to the inner wall in such a way that a gas flow in the direction of the dust outlet arises in the flow-stabilized zone. The dust discharge is thereby intensified.

Furthermore, it is expedient if the dividing wall between the vertical passes is angled in the direction of the vertical pass having downward flow, since the flow is thereby passed more intensively along the inner wall and the dust separation is improved.

In addition, it is advantageous if, at the end of the rear wall as viewed in the direction of flow, the inner wall is bent to the inside and is connected to the outer wall at the top part via a gastight tube-web construction so that a dust-collecting pocket forms.

Exemplary embodiments of the invention are shown in the drawing with reference to a steam generator having two vertical open passes and a horizontal bank pass as well as to a vertical steam generator, as often used for incinerator plants.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. Elements of the plant which are not shown are, for example, the combustion grate and the slag-removal system. The direction of flow of the media is designated by arrows.

DESCRIPTION OF THE PREFERRED EMBODIMENTS

Figure 1:
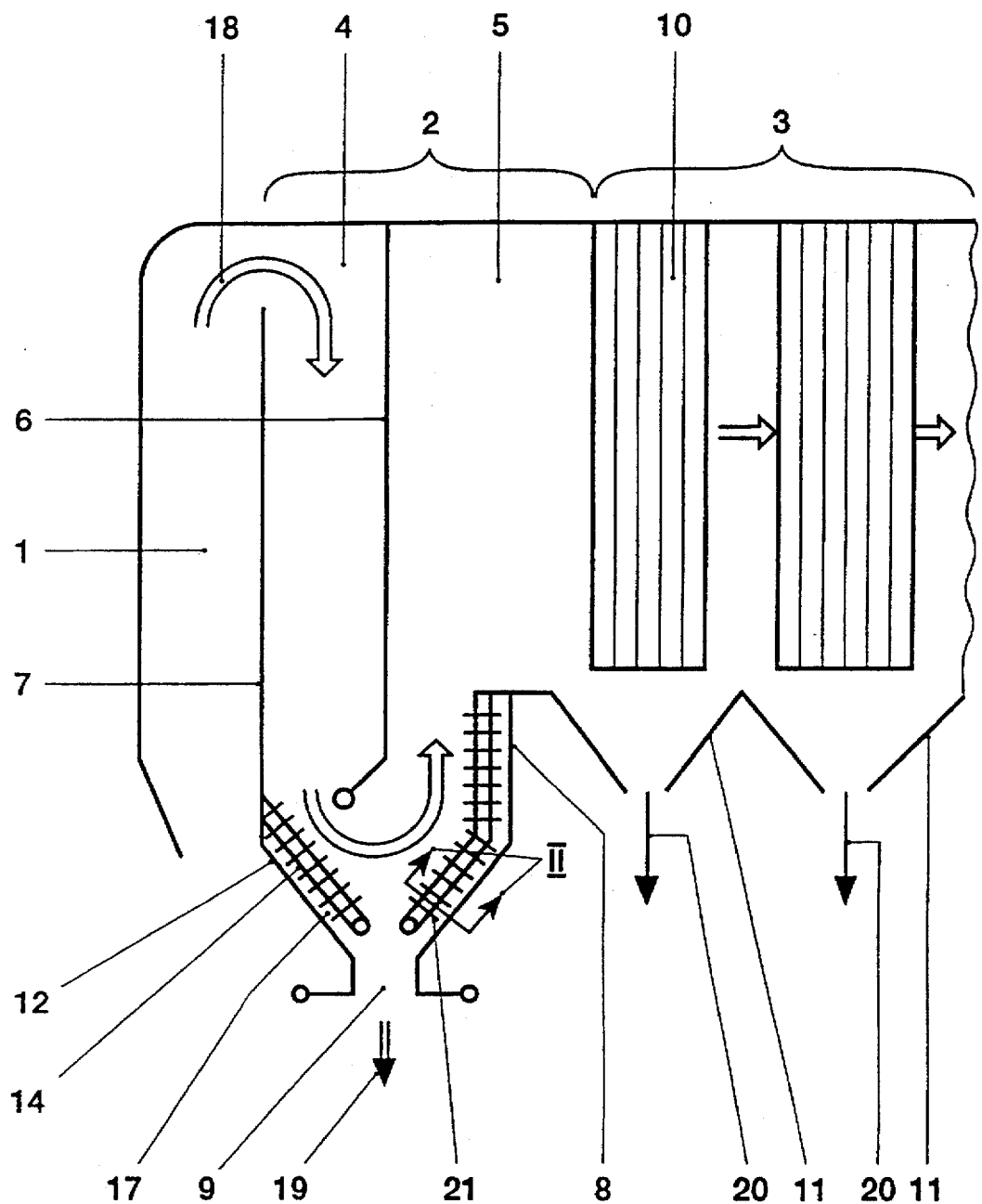
FIG. 1 shows a partial longitudinal section of the steam generator according to the invention having a horizontal bank pass.

Referring now to the drawings, wherein like reference numerals designate identical or corresponding parts throughout the several views, FIG. 1 shows a partial longitudinal section of a boiler having a natural circulation system for an incineration plant. The boiler is a refuse incineration boiler with horizontal convective pass which consists of a combustion chamber 1, a radiation part 2 and a convection part 3. In this exemplary embodiment, the radiation part 2 has a first vertical open pass 4 and a second vertical open pass 5, the two passes 4, 5 being separated from one another by an essentially vertical dividing wall 6. In the region of the gas deflection between the two open passes 4 and 5, the boiler walls 7, 8 narrow in a funnel shape. At their bottom end, they form an opening 9 for the dust discharge. Adjoining the second vertical open pass 5 is the convection part 3 of the boiler. This convection part 3 includes of a horizontal bank pass 10. A plurality of funnels 11 are arranged at the underside of the horizontal pass 10.

According to the invention, the boiler wall is designed as a double wall in the region of the gas deflection from the first vertical open pass having downward flow to the second vertical open pass having upward flow.

Figure 2:
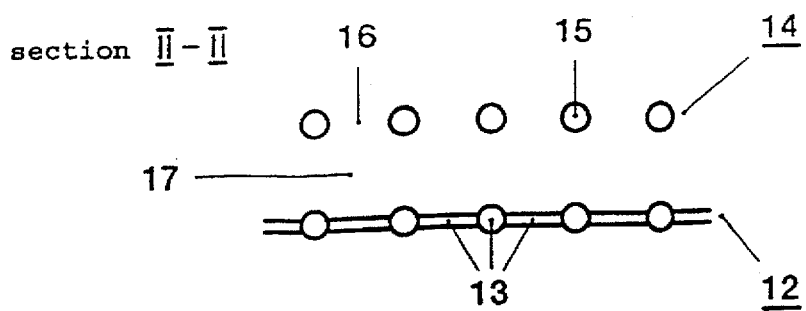
FIG. 2 shows a section in the region of the gas deflection in the open passes along line II—II in FIG. 1.

As can be recognized from the section according to FIG. 2, the outer gastight wall 12 consists of the conventional tube-web-tube construction 13 in boilermaking. On the other hand, the inner wall 14 is formed from tubes 15 without webs arranged in between. In this case, the inner wall 14 may either be arranged at both the front wall 7 and the rear wall 8 or else only at the rear wall 8.

There is an intermediate space 16 in each case between the tubes 15. The inner wall 14 and the outer wall 12 are arranged in such a way that they form an intermediate space 17 which constitutes a flow-stabilized zone. The two walls 12, 14 run largely parallel to one another and are integrated in the natural circulation system of the boiler. They are cooled by evaporating water which flows through the tubes. According to FIG. 1, a plurality of baffle plates 21 are arranged on the inner wall 14 approximately perpendicularly to the gas-flow direction, which baffle plates 21 are welded to the tubes 15 for cooling purposes.

The exhaust gas 18 coming out of the combustion chamber 1 first of all flows downward via the first vertical open pass 4, is deflected in the region of the funnel, then flows upward in the second vertical open pass 5 and finally passes into the horizontal bank pass 10 before it then flows into the gas-cleaning plant (not shown here) arranged downstream of the boiler.

The exhaust gas 18 from the combustion chamber of the incinerator plant has a relatively large amount of dust 19 (about 2–5 g/Nm$^3$). This high dust portion is reduced by means of the invention, the dust portion of the exhaust gases 18 being reduced before the exhaust gases 18 enter the convective part 3 of the boiler, specifically in the region of the gas deflection from the vertical open pass 4 having downward flow to the vertical open pass 5 having upward flow. The separation of the dust 19 is improved by the creation of flow-stabilized zones 17 as a result of the arrangement of a double wall in this region of the boiler. Additional improvements in the dust separation result from the baffle plates 21 or the guide plates 22 and from the configuration of the dividing wall 6, which is angled between the vertical gas passes 4, 5 in the direction of the vertical pass having downward flow 4 so that the flow passes along the inner wall 14 in an intensified manner. It is advantageous if measures are taken to compensate for the secondary flow arising during the deflection of the gas flow, in particular an additional gas injection and/or guidance of the gas flow via guide plates.

The dust 19 which has separated in this region is discharged via the opening 9 and is cooled down by means of quenching or by cooling while excluding oxygen in such a way that dioxin formation is suppressed. This dioxin-free dust is not mixed with the dioxinous flue dust 20 from the funnels 11 of the horizontal pass 10, so that substantially fewer environmental problems occur.

Figure 3A:
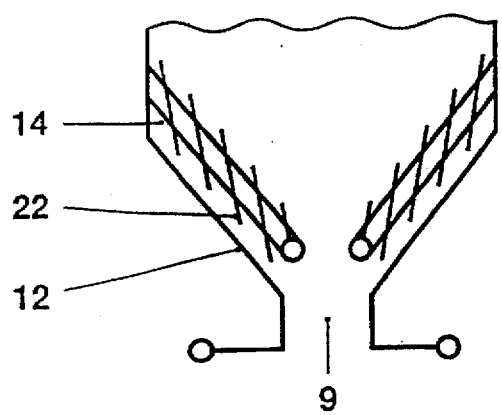
FIG. 3 shows a detail in the region of the dust discharge (two different variants—FIGS. 3a and 3b—from that in FIG. 1 for arranging the plates on the tubes of the inner wall, and FIG. 3c a plan view of FIG. 3b)
Figure 3B:
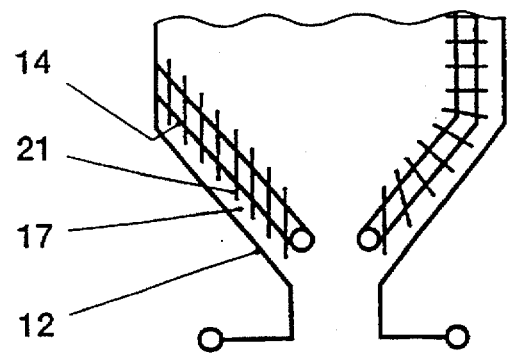

As further exemplary embodiments, FIGS. 3a and 3b each show a detail in the region of the dust discharge. According to FIG. 3a, unlike FIG. 1, the plates on the tubes 15 of the inner wall 14 are designed as guide plates 22 and are arranged in such a way that a gas flow in the direction of the dust outlet 9 arises in the flow-stabilized zone 17. The discharge of the dust is thereby improved.

Figure 3C:
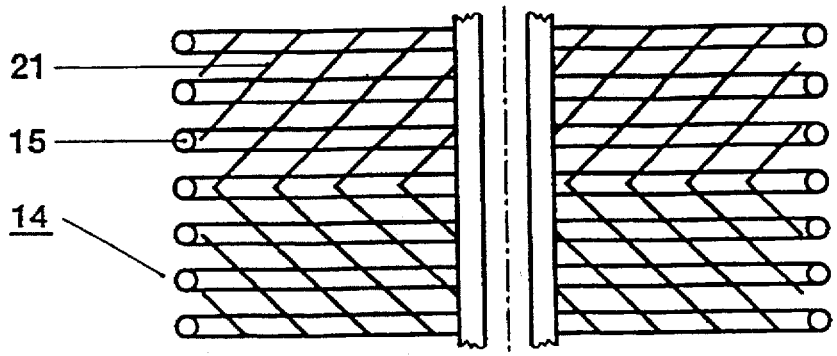

In the embodiment variant according to FIG. 3b, the plates 21 are arranged herringbone-like on the wall 14, as is readily apparent from the plan view according to FIG. 3c. This arrangement enables the plates 21 to be disposed perpendicularly to the gas flow, which is affected by a secondary flow caused by deflection.

Figure 4:
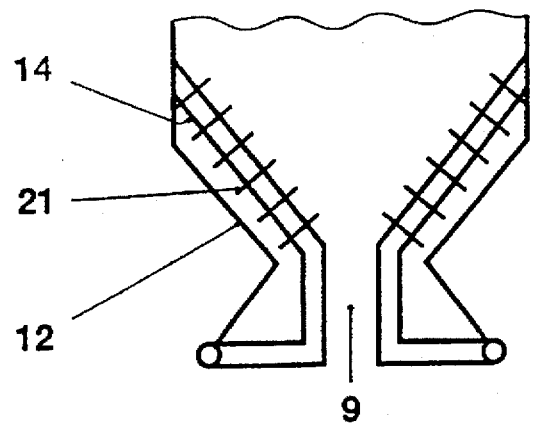
FIG. 4 shows a detail in the region of the duct discharge (different tube layout of the inner wall from that in FIG. 1)

FIG. 4 shows a modified detail in the region of the dust discharge. An improved tube layout can be recognized compared with FIG. 1.

A further advantage of the invention includes in the fact that the inner wall 14 and the outer wall 12 are easy to clean by vibrations.

Figure 5:
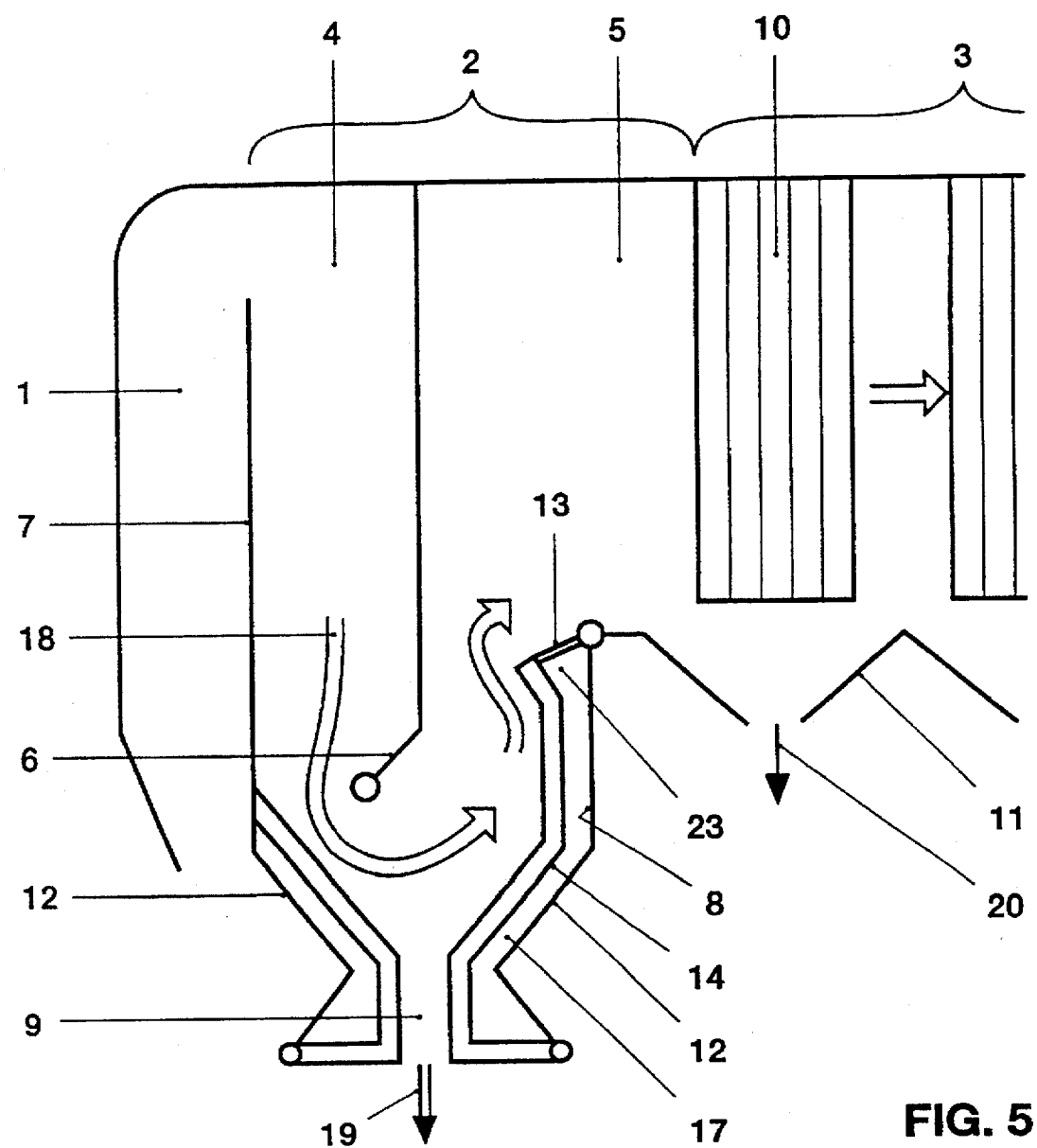
FIG. 5 shows a detail in the region of the dust discharge (arrangement of a dust-collecting pocket)

FIG. 5 shows a further embodiment variant. At the top end of the rear wall 8, the inner wall 14 is here bent in the direction of the funnel interior. The top part of the wall 14 is designed in such a way that the tubes 15 are joined together by welding in each case to webs arranged in between to form a gastight tube-web construction 13, which in turn is connected to the outer wall 12 so that a dust-collecting pocket 23 in which the dust may readily be deposited is formed at this point.

Figure 6:
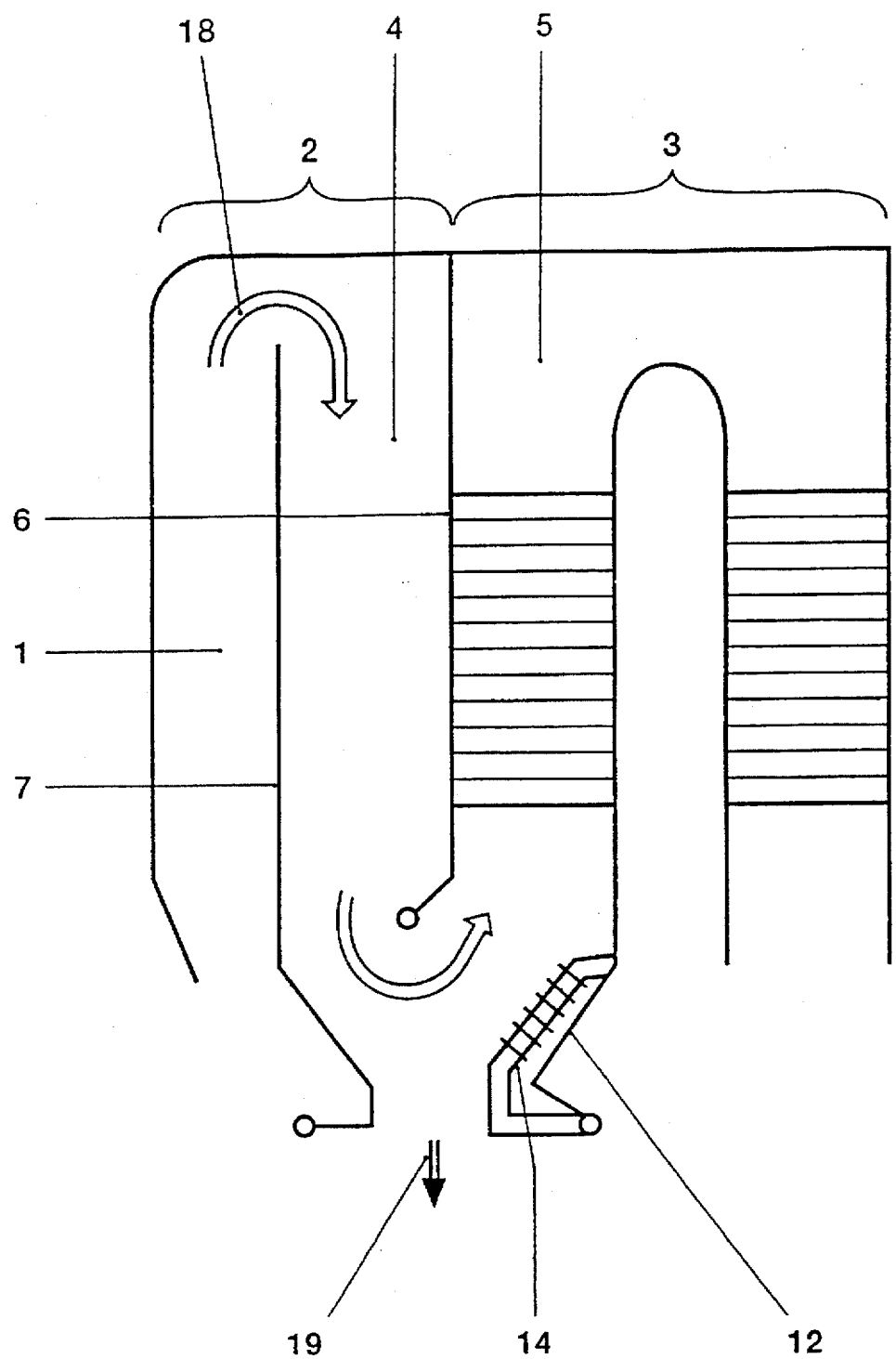
FIG. 6 shows a partial longitudinal section of the vertical steam generator according to the invention.

As shown in FIG. 6, the invention may also be used for vertical steam generators in which the exhaust gas 18 flows vertically through the convection part 3.

The invention is of course not restricted to the exemplary embodiments shown hitherto. It may also be used for steam generators having a forced circulation system or a once-through system.

Since the previous form of an incinerator plant boiler in conventional practice is only slightly modified, it is possible also to use the invention in existing plants.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

1 Combustion chamber
2 Radiation part
3 Convection part
4 First vertical gas pass
5 Second vertical gas pass
6 Dividing wall
7 Front wall
8 Rear wall
9 Opening for dust discharge
10 Horizontal bank pass
11 Funnel
12 Gastight outer wall
13 Tube-web-tube construction
14 Inner wall
15 Tubes of the inner wall inner wall
17 Intermediate space between the tubes of the inner wall
18 Intermediate space between inner and outer wall
18 Exhaust gas
19 Dioxin-free dust
20 Dioxinous flue dust
21 Baffle plates on the inner wall
22 Guide plates on the inner wall
23 Dust-collecting pocket

What is claimed as new and desired to be secured by Letters Patent of the United States is:

1. A method of reducing the dust content of the dust-laden exhaust gases of a steam generator which consists of a combustion chamber, a radiation part and a convection part and has at least two vertical gas passes, wherein the dust portion of the exhaust gases is reduced before the exhaust gases enter the convective part of the steam generator, the separation of the dust being improved in the region of the gas deflection from the vertical pass having downward flow to the vertical pass having upward flow by creating flow-stabilized stabilized zones, and the dust being discharged from this region by way of an opening.

2. The method as claimed in claim 1, wherein the dust discharged from the opening is cooled by means of quenching or by cooling while suppressing dioxin formation.

3. The method as claimed in claim 1, wherein measures are taken to compensate for the secondary flow arising during the deflection of the gas flow, in particular an additional gas injection and/or guidance of the gas flow by way of guide plates.

4. A device for reducing the dust portion of the exhaust gases of a stem generator, the steam generator comprising a combustion chamber, a radiation part and a convection part including a from wall and a rear wall and having at least two vertical gas passes which are separated from one another by a dividing wall, and the steam generator having an opening for the dust discharge in the region of the gas deflection from the vertical pass having downward flow to the vertical pass having upward flow, wherein the from wall and/or the rear wall of the steam generator is of double-sided design in the region of the gas deflection from the vertical pass having downward flow to the vertical pass having upward flow, the outer wall comprising a gastight tube-web-tube construction and the inner wall comprising tubes which are arranged with an intermediate space through which flow can occur between the tubes, a flow-stabilized zone being defined by the outer wall and the inner wall, and the inner and the outer wall being cooled by means of cooling fluid flowing through the tubes.

5. The device as claimed in claim 4, wherein the inner and outer walls are integrated in the circulation system of the steam generator, and the cooling fluid is evaporating water.

6. The device as claimed in claim 4, wherein baffle plates are arranged on the inner wall essentially perpendicularly to the direction of flow.

7. The device as claimed in claim 4, wherein baffle plates are arranged to form at least one V-shape on the inner wall.

8. The device as claimed in claim 4, wherein guide plates are attached to the inner wall to induce a gas flow in the flow stabilized zone in the direction of the dust discharge.

9. The device as claimed in claim 4, wherein the dividing wall between the vertical passes is angled in the direction of the vertical pass having downward flow.

10. The device as claimed in claim 4, wherein, at the end of the rear wall as viewed in the direction of flow, the inner wall is bent to the inside and is connected to the outer wall at the top part via a gastight tube-web construction.

* * * * *